United States Patent
Kato et al.

(10) Patent No.: US 7,431,518 B2
(45) Date of Patent: Oct. 7, 2008

(54) OPTICAL DEVICE, LENS UNIT, AND IMAGING APPARATUS

(75) Inventors: Takashi Kato, Minami-Ashigara (JP); Tetsuya Ohtsuka, Asaka (JP); Hitoshi Miyano, Saitama (JP)

(73) Assignees: FUJIFILM Corporation, Tokyo (JP); FUJINON Corporation, Saitama (JP)

( * ) Notice: Subject to any disclaimer, the term of this patent is extended or adjusted under 35 U.S.C. 154(b) by 461 days.

(21) Appl. No.: 11/201,152

(22) Filed: Aug. 11, 2005

(65) Prior Publication Data

US 2006/0044640 A1    Mar. 2, 2006

(30) Foreign Application Priority Data

Aug. 27, 2004  (JP) .............. 2004-248307

(51) Int. Cl.
 *G02F 1/00* (2006.01)

(52) U.S. Cl. .............. 396/506; 359/252; 359/253; 359/272

(58) Field of Classification Search .......... 396/506; 359/252, 253, 272
See application file for complete search history.

(56) References Cited

U.S. PATENT DOCUMENTS

| | | | | |
|---|---|---|---|---|
| 6,449,081 | B1* | 9/2002 | Onuki et al. | 359/245 |
| 6,702,483 | B2* | 3/2004 | Tsuboi et al. | 396/449 |
| 7,224,534 | B2* | 5/2007 | Ootsuka et al. | 359/665 |
| 2004/0227063 | A1* | 11/2004 | Viinikanoja | 250/216 |
| 2004/0228002 | A1* | 11/2004 | Schrader | 359/666 |
| 2005/0113912 | A1* | 5/2005 | Feenstra et al. | 623/6.13 |
| 2005/0199720 | A1* | 9/2005 | Barkan | 235/454 |
| 2005/0264864 | A1* | 12/2005 | Onuki et al. | 359/253 |
| 2006/0028734 | A1* | 2/2006 | Kuiper et al. | 359/676 |
| 2006/0047039 | A1* | 3/2006 | Kato et al. | 524/342 |
| 2006/0215273 | A1* | 9/2006 | Kuiper et al. | 359/666 |
| 2006/0279848 | A1* | 12/2006 | Kuiper et al. | 359/666 |
| 2007/0146893 | A1* | 6/2007 | Kuiper et al. | 359/666 |

FOREIGN PATENT DOCUMENTS

| | | |
|---|---|---|
| JP | 5-151961 A | 6/1993 |
| JP | 9-501778 A | 2/1997 |
| JP | 2000-347005 A | 12/2000 |
| JP | 2001-13306 A | 1/2001 |
| JP | 2003-177219 A | 6/2003 |
| WO | WO 95/05622 A1 | 2/1995 |

OTHER PUBLICATIONS

"Philips' Fluid Lenses", [online] Mar. 3, 2004, Royal Philips Electronics, [searched on Mar. 31, 2004], Internet. (URL:http://www.dpreview.com/new/0403/04030302philipsfluidlens.asp).

\* cited by examiner

*Primary Examiner*—W. B. Perkey
*Assistant Examiner*—Warren K Fenwick
(74) *Attorney, Agent, or Firm*—Sughrue Mion, PLLC

(57) ABSTRACT

An optical device and a lens unit each include a liquid container containing an insulating liquid and an electroconductive liquid which are mutually immiscible and optically transparent and have different refractive indices. The optical device and the lens unit also have a gas-absorbing material in or around the liquid container. The gas-absorbing material absorbs gas generated by energization. The optical device and the lens unit can maintain their optical characteristics even if voltage is repeatedly applied. An imaging apparatus includes an optical shooting system having the optical device. The imaging apparatus takes pictures by capturing object light coming through the optical shooting system.

10 Claims, 10 Drawing Sheets

(A)

(B)

OPTICAL DEVICE, LENS UNIT, AND IMAGING APPARATUS

BACKGROUND OF THE INVENTION

1. Field of the Invention

The present invention relates to an optical device and a lens unit, each containing an insulating liquid and an electroconductive liquid which are mutually immiscible and optically transparent and have different refractive indices. The present invention also relates to an imaging apparatus which takes pictures by capturing object light coming through an optical shooting system including the optical device.

2. Description of the Related Art

There are some types of cameras, such as electronic still cameras and film cameras. The electronic still camera forms an image of an object on a CCD (charge coupled device) solid imaging device and captures the signals of the image. The film camera takes pictures on a photographic film. Some of these cameras have a zooming mechanism for freely setting a shooting view angle. Such a camera includes a shooting lens whose focal length is varied according to the operation of a zoom switch. The shooting lens is generally composed of some lens elements, that is, it is a compound lens, and the relative positions of the lens elements are adjusted according to the focal length set by the zoom switch. This type of camera includes a cam mechanism. The cam mechanism transfers the rotation of a motor according to the operation of the zoom switch so that the lens elements are independently shifted along the optical axis direction to adjust their relative positions, thereby changing the focal length.

The lens elements include a focus lens for adjusting the focus. A lens driving mechanism for moving the focus lens may be provided separately from the cam mechanism.

As an alternative to the shooting lens having driving mechanisms, a liquid or fluid lens has recently been proposed which contains mutually immiscible two types of liquid having different refractive indices and whose focal length is variable, by, for example, "Philips' Fluid Lenses" of Royal Philips Electronics, dated Mar. 3, 2004 on a website.

This liquid lens contains mutually immiscible two types of liquid having different refractive indices. One of the liquids is electrically conductive aqueous solution, and the other is an electrically insulating oil. The two liquids are contained in a liquid container made of a short tube whose ends are closed with optically transparent end caps. The inner wall of the tube and the inner wall of one of the end caps are coated with a water-repellent film. In the liquid lens having such a structure, the inner walls coated with the water-repellent film of the tube and one end cap repel the electroconductive aqueous solution, so that the electroconductive aqueous solution comes into contact with the other end cap, forming a hemispherical shape. Consequently, the interface between the electroconductive aqueous solution and the insulating oil serves as a concave lens. The liquid lens also includes two electrodes for applying a voltage to the electroconductive aqueous solution. One of the two electrodes is in contact with the electroconductive aqueous solution and the other is provided at the rear of the water-repellent film. When a voltage is applied between the electrodes, electrical charges are released to the electroconductive aqueous solution from the electrode in contact with the electroconductive aqueous solution. The released charges stay at the interface between the electroconductive aqueous solution and the insulating oil. The charges at the interface and the opposite-polarity charges built up on the electrode at the rear of the water-repellent film are attracted to each other by Coulomb force, and the charges in the electroconductive aqueous solution are drawn to the vicinity of the water-repellent film. Consequently, the electroconductive aqueous solution wets the water-repellent film coating the inner wall of the tube to change the shape of the interface between the two liquids. Specifically, as the voltage applied to the electroconductive aqueous solution is increased, the curvature radius of the interface between the electroconductive aqueous solution and the insulating oil, which has served as a concave lens initially, is changed, so that, for example, the shape of the interface becomes completely flat or the electroconductive aqueous solution is allowed to serve as a convex lens. Thus, the focal length can be varied.

If a voltage is repeatedly applied between the two electrodes of the liquid lens so that electrical charges are repeatedly released to the electroconductive aqueous solution, the electroconductive aqueous solution may be electrolyzed to generate hydrogen and oxygen and, thus, allow bubbles to be trapped in the liquid container disadvantageously. The bubbles diffuse light coming into the liquid lens, thus degrading the performance of the lens. The bubbles may also damage the liquid container, depending on where the bubbles are generated.

These problems can occur not only in the liquid lens, but also in the cases where the principle of the liquid lens that the shape of the interface is changed is applied to other optical devices.

SUMMARY OF THE INVENTION

The present invention has been made in view of the above circumstances and provides an optical device and a lens unit which maintain their optical characteristics even if a voltage is repeatedly applied, and an imaging apparatus which takes pictures by capturing object light coming through an optical shooting system including the optical device.

According to an aspect of the present invention, an optical device is provided which includes a liquid container transmitting light at least in the optical axis direction, containing an insulating liquid and an electroconductive liquid, a first electrode in contact with the electroconductive liquid, a second electrode isolated from the electroconductive liquid, and a gas-absorbing material disposed in or around the liquid container. The electroconductive liquid generates gas by energization. The insulating liquid and the electroconductive liquid are mutually immiscible and optically transparent, and have different refractive indices. The gas-absorbing material absorbs the gas generated from the electroconductive liquid.

Since the optical device has the gas-absorbing material in or around the liquid container and the gas-absorbing material absorbs the gas generated by energization, the gas generated in the liquid container is absorbed by the gas-absorbing material before the gas turns into bubbles. Thus, the bubbles are prevented from being trapped in the liquid container. Consequently, the optical characteristics of the optical device can be maintained over a long time, even if voltage is repeatedly applied to the optical device.

The gas-absorbing material may adsorb or react with the gas to absorb it.

Preferably, the gas-absorbing material is in contact with or close to at least one of the first electrode and the second electrode.

By disposing the gas-absorbing material in contact with or close to either or both of the electrodes, at which the gas is generated, the gas can be more efficiently absorbed.

The gas-absorbing material may be contained in at least one of the insulating liquid and the electroconductive liquid.

By adding the gas-absorbing material to the liquid, the gas-absorbing material can efficiently absorb the gas dissolved in the liquid.

Preferably, the gas-absorbing material forms a gas-absorbing member disposed in the liquid container.

By disposing the gas-absorbing member in the liquid container, the gas in the container can be efficiently absorbed.

The gas-absorbing material may form part of the wall of the liquid container.

By forming part of the wall of the liquid container with the gas-absorbing material, the gas in the liquid container can be efficiently absorbed.

Preferably, the electroconductive liquid is an aqueous solution and the gas-absorbing material absorbs hydrogen.

If the electroconductive liquid is an aqueous solution, it is electrolyzed into hydrogen and oxygen. The generated hydrogen is absorbed by the gas-absorbing material, and thus the optical characteristics of the optical device can be maintained.

The electroconductive liquid may be an aqueous solution and the gas-absorbing material absorbs oxygen.

The aqueous solution used as the electroconductive liquid is electrolyzed into hydrogen and oxygen. The generated oxygen is absorbed by such a gas-absorbing material, and thus the optical characteristics of the optical device can be maintained.

According to another aspect of the present invention, a lens unit is provided which includes a liquid container transmitting light at least in the optical axis direction, containing an insulating liquid and an electroconductive liquid, a first electrode in contact with the electroconductive liquid, a second electrode isolated from the electroconductive liquid, and a gas-absorbing material disposed in or around the liquid container. The electroconductive liquid generates gas by energization. The insulating liquid and the electroconductive liquid are mutually immiscible and optically transparent, and have different refractive indices. The gas-absorbing material absorbs the gas generated from the electroconductive liquid. The interface between the insulating liquid and the electroconductive liquid is varied according to voltage applied between the first electrode and the second electrode.

In the lens unit, the gas generated in the liquid container is absorbed by the gas-absorbing material before the gas turns into bubbles, as in the foregoing optical device. Consequently, the bubbles are prevented from being trapped in the liquid container, and thus the optical characteristics of the lens unit can be maintained over a long time.

Each element of the lens unit may be in the same form as the corresponding element of the foregoing optical device.

According to another aspect of the present invention, an imaging apparatus is provided which takes pictures by capturing object light coming through an optical shooting system incorporated therein. The optical shooting system includes a liquid container transmitting light at least in the optical axis direction, containing an insulating liquid and an electroconductive liquid, a first electrode in contact with the electroconductive liquid, a second electrode isolated from the electroconductive liquid, and a gas-absorbing material disposed in or around the liquid container. The insulating liquid and the electroconductive liquid are mutually immiscible and optically transparent, and have different refractive indices. The electroconductive liquid generates gas by energization, and the gas-absorbing material absorbs the gas. The optical shooting system also has a controlling section which varies the shape of the interface between the insulating liquid and the electroconductive liquid according to voltage applied between the first electrode and the second electrode.

Since the imaging apparatus includes the optical device having the gas-absorbing material in or around the liquid container and the gas-absorbing material absorbs the gas generated in the liquid container before the gas turns into bubbles. Thus, the bubbles are prevented from being trapped in the liquid container. Consequently, the optical characteristics of the imaging apparatus can be maintained over a long time, even if voltage is repeatedly applied to the first electrode and the second electrode. Furthermore, the imaging apparatus does not need any lens driving mechanism which shifts plural lens elements independently so as to vary the focal length. Accordingly, the size and thickness of the imaging apparatus can be reduced.

Preferably, the imaging apparatus further includes a solid imaging device on which the object light forms an object image and which outputs signals representing the object image.

By providing such a solid imaging device in the imaging apparatus, the size and thickness can be further reduced.

The present invention achieves an optical device and a lens unit which can maintain their optical characteristics even if voltage is repeatedly applied to them. The present invention also achieves an imaging apparatus which takes pictures by capturing object light coming through an optical shooting system including the optical device.

DETAILED DESCRIPTION OF THE INVENTION

Prior to the description of the present invention, disadvantages of the known liquid lens will be analyzed.

Figure 1:
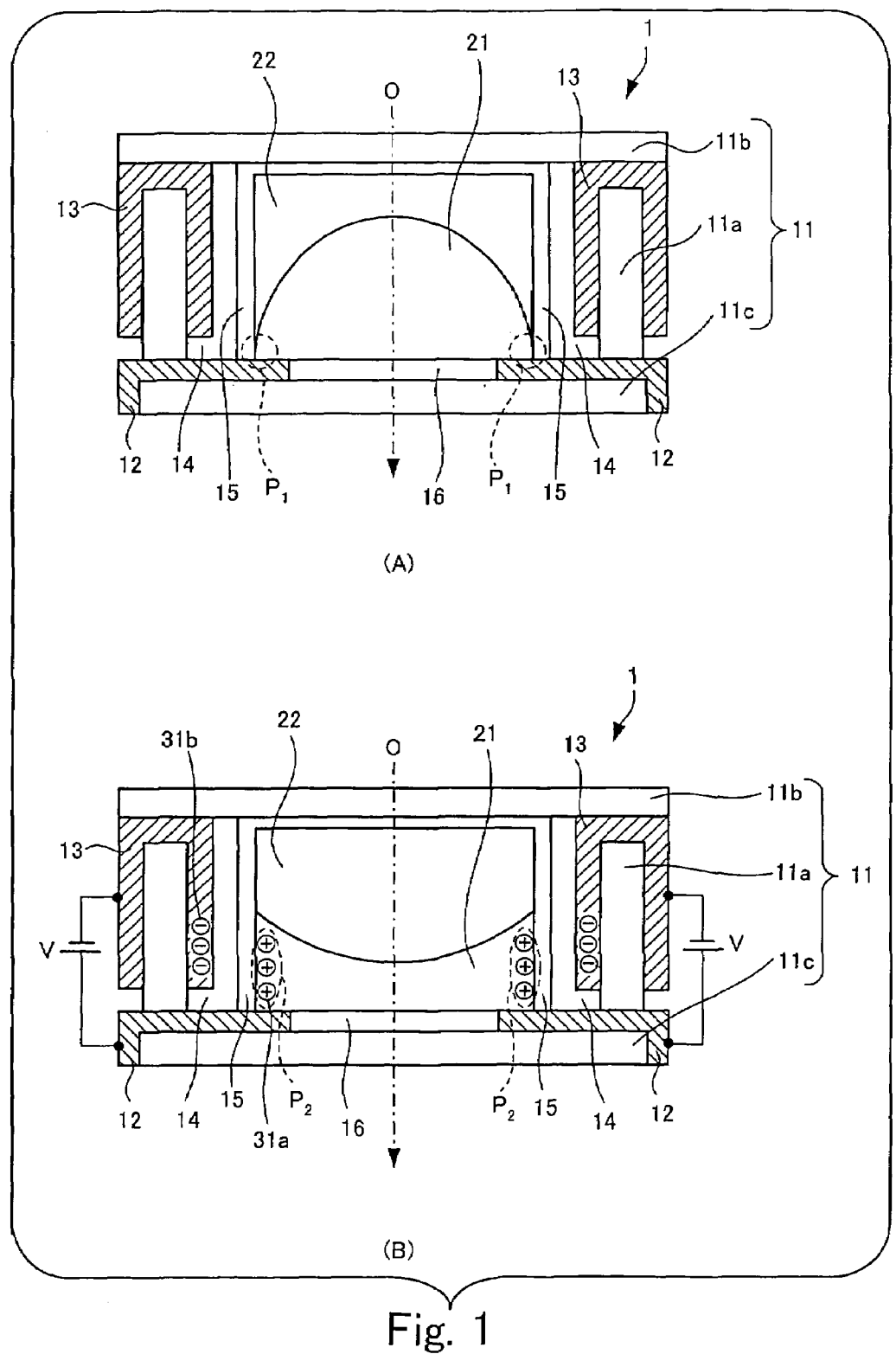
FIG. 1 is a schematic illustration of the structure of a known liquid lens.

FIG. 1 is a schematic illustration of the structure of the known liquid lens. In the following description, light is transmitted in the direction indicated by arrow O, and comes into the lens through the upper side (from above in parts (A) and (B) of FIG. 1) and goes out through the lower side (from the bottom in parts (A) and (B) of FIG. 1).

As shown in FIG. 1, the liquid lens 1 includes a glass container 11 made of a glass tube 11a whose ends are closed with glass caps 11b and 11c. The glass container 11 contains transparent water 21 containing a supporting electrolyte and an insulating, transparent oil 22. These two liquids are immiscible with each other. Since the oil 22 has a higher refractive index than the water 21, the oil 22 serves as a lens refracting light.

The inner wall of the tube 11a and the inner surface of the cap 11b covering the upper end of the tube 11a are coated with a water-repellent film 15. The inner surface of the cap 11c covering the lower end of the tube 11a is coated with a hydrophilic film 16.

The liquid lens 1 also has a first electrode 12 in contact with the water 21 and a second electrode 13 isolated from the water 21 by an insulating film 14 provided between the tube 11a and the water-repellent film 15.

When no voltage is applied between the first electrode 12 and the second electrode 13, the water 21 is repelled by the water-repellent film 15 to come in contact with the hydrophilic film 16, so that the contact area $P_1$ of the water 21 with the water-repellent film 15 is reduced, as shown in part (A) of FIG. 1. Consequently, the water 21 is held in a hemispherical shape and the oil 22 is pressed by the water 21 to form into such a shape that a cylinder is hemispherically scooped. Since the interface between the water 21 and the oil 22 is formed in a concave shape when viewed from the oil 22, the liquid lens 1 serves as a concave lens as shown in part (A) of FIG. 1.

When, for example, a positive voltage is applied to the first electrode 12 and a negative voltage is applied to the second electrode 13, positive charges 31a are released from the first electrode 12 to the water 21, and negative charges 31b build up on the second electrode 13. Then, the positive charge 31a released to the water 21 are attracted to the negative charge 31b on the second electrode 13 by Coulomb force, and the contact area $P_2$ of the water 21 with the water-repellent film 15 increases according to the magnitude of the applied voltage. In part (B) of FIG. 1, the interface between the water 21 and the oil 22 forms a convex curve when viewed from the oil 22, and thus the liquid lens 1 serves as a convex lens. The shape of the interface between the water 21 and the oil 22 can be gradually varied by adjusting the voltage applied between the first electrode 12 and the second electrode 13.

Thus, the liquid lens 1 can allow zooming and focusing without using any mechanism for moving the lens, by varying the shape of the interface between the water 21 and the oil 22.

Unfortunately, it is considered that if a voltage is repeatedly applied between the first electrode 12 and the second electrode 13 to release charges to the water 21 again and again, the water 21 may be electrolyzed into hydrogen and oxygen, so that bubbles are trapped in the container 11. The bubbles diffuse the light coming into the liquid lens 1, thereby degrading the performance of the lens. In addition, the container 11 may be damaged depending on where the bubbles are generated.

The present invention has been made on the basis of the detailed analysis as described above.

Embodiments of the present invention will now be described with reference to the drawings.

Figure 2:
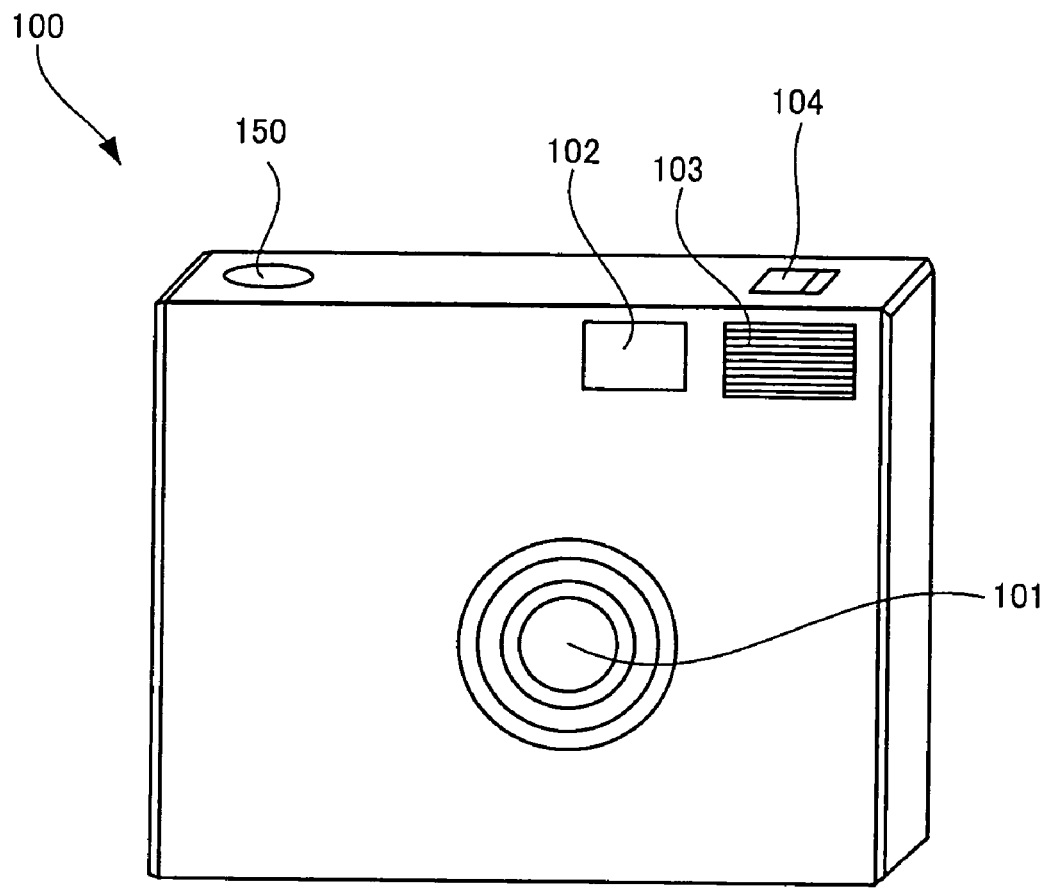
FIG. 2 is a perspective view obliquely from the front side of a digital camera to which an embodiment of the present invention is applied.

FIG. 2 is a perspective illustration viewed obliquely from the front side of a digital camera to which an embodiment of the present invention is applied.

As shown in FIG. 2, the digital camera 100 has a shooting lens 101 in the central region of its front. The digital camera 100 also has an optical finder object window 102 and a fill light emitter 103 in the upper region of the front. A sliding power switch 104 and a release switch 150 are further provided on the upper surface of the digital camera 100.

Figure 3:
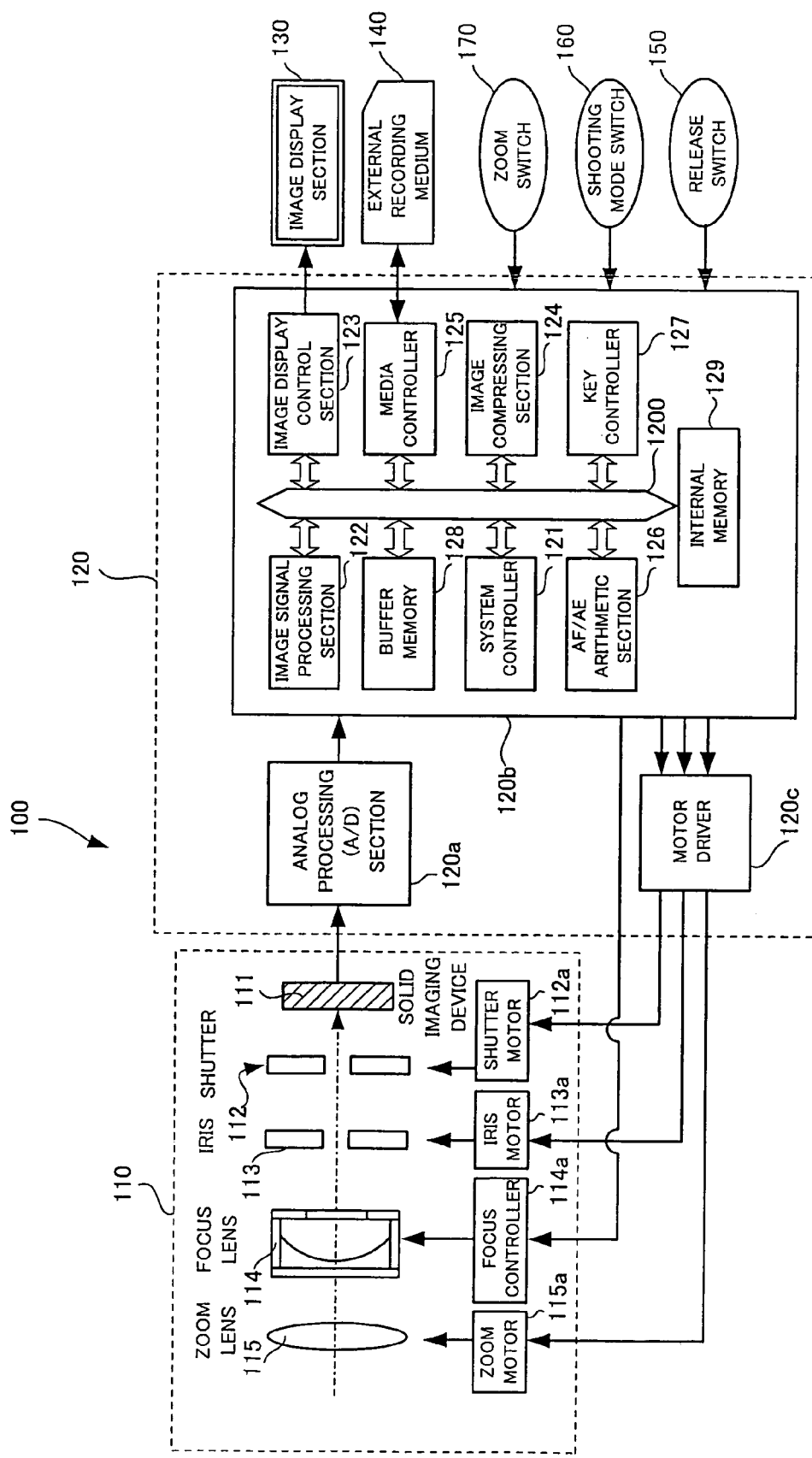
FIG. 3 is a structural block diagram of the digital camera shown in FIG. 2.

FIG. 3 is a structural block diagram of the digital camera shown in FIG. 2.

As shown in FIG. 3, the digital camera 100 mainly includes two sections: an optical shooting system 110; and a signal processor 120. The digital camera 100 further includes an image display section 130 which displays images taken, an external recording medium 140 on which signals of the taken images are recorded, and a zoom switch 170, a shooting mode switch 160, and the release switch 150 for respective operations.

First, the structure of the optical shooting system 110 will be described with reference to FIG. 3.

In the digital camera 100, object light comes in from the left of FIG. 3 and runs through a zoom lens 115 and a focus lens 114 to an iris 113 for adjusting the intensity of the object light. Then, the light forms an image on a solid imaging device 111 when the shutter 112 is open. The solid imaging device 111 is one type of the solid imaging device of the present invention. Optical shooting systems generally include plural lenses, and in which at least one of the lenses is largely involved in focusing and the focal length depends of the relative positions of the lenses. In FIG. 3, a zoom lens 115 is involved in the adjustment of the focal length and the focus lens 114 is involved in focusing.

The zoom lens 115, the iris 113, and the shutter 112 are driven to shift by a zoom motor 115a, an iris motor 113a, and a shutter motor 112a, respectively. For the focus lens 114, a focus controller 114a for varying the shape of the focus lens 114 is provided instead of a motor. Directions for operating the zoom motor 115a, iris motor 113a, and shutter motor 112a are transmitted to the motors from a digital signal processing section 120b of the signal processor 120 through a motor driver 120c, and directions for operating the focus controller 114a are directly transmitted to the controller from the digital signal processing section 120b.

The zoom lens 115 is shifted along the optical axis by the zoom motor 115a. By shifting the zoom lens 115 according to the signals from the signal processor 120, the focal length is varied and a shooting magnification is thus set.

The focus lens 114 is intended for a TTLAF (through-the-lens auto focus) system. In the TTLAF system, an AF/AE arithmetic section 126 of the signal processor 120 detects the contrast of image signals obtained in the solid imaging device 111 while the focus lens is shifted along the optical axis, and the position of the focus lens 114 is adjusted to the focal point which is defined by the lens position where the peak of the contrast is obtained. The TTLAF system automatically brings into focus an object whose contrast comes to a peak (that is, the closest object), for taking pictures. In the present embodiment, the focus controller 114a varies the lens shape of the focus lens 114 to bring the closest object into focus, instead of shifting the focus lens 114. The structure of the focus lens 114 and how the shape of the lens is varied will be described in detail later.

The iris 113 is driven according to the directions transmitted from the AF/AE arithmetic section 126 of the digital processing section 120b, thereby adjusting the intensity of the object light.

Up to this point the structure of the optical shooting system 110 has been described.

The structure of the signal processor 120 will now be described. The signals of the object image formed on the solid imaging device 111 in the optical shooting system 110 are read out to an analog processing (A/D) section 120a. The analog processing (A/D) section 120a converts the analog signals into digital signals and sends them to the digital signal processing section 120b. The digital signal processing section 120b includes a system controller 121 containing a program implementing an operational procedure. The signals are processed in the digital signal processing section 120b according to the program. A bus 1200 performs data communication between the system controller 121 and the other sections of the signal processing section 120b, such as an image signal processing section 122, an image display control section 123, an image compressing section 124, a media controller 125, the AF/AE arithmetic section 126, a key controller 127, a buffer memory 128, and an internal memory 129. The internal memory 129 serves as a buffer for the data communication through the bus 1200. Data of variables are written into the internal memory 129 as occasion arises, according to the progress of the processing in each section. The system controller 121, the image signal processor 122, the image display control section 123, the image compressing section 124, the media controller 125, the AF/AE arithmetic section 126, and the key controller 127 perform their respective appropriate processing with reference to the data. Directions of the system controller 121 are transmitted to the sections through the bus 1200 to start their processing. Then, the data in the internal memory 129 are rewritten according to the progress of the processing. The system controller 121 monitors the operational states of the sections to control them. In other words, the process of each part of the digital signal processing section 120b is started after turning on the power, according to the procedure of the program in the system controller 121. For example, on operating the release switch 150, the zoom switch, or the shooting mood switch, the information that the operation has been made is transmitted to the system controller 121 through the key controller 127, and processing based on the operation is performed according to the procedure of the program in the system controller 121.

On completing release, the analog image data read out of the solid imaging device are converted from analog signals to digital signals in the analog processing (A/D) section 120a. The digitized image data are temporarily accumulated in the buffer memory 128 of the digital signal processing section 120b. The RGB signals of the digitized image data are converted into YC signals in the image signal processing section 122, and are subsequently subjected to compression referred to as JPEG compression in the image compressing section 124 to compile an image file. Thus, the image file is transmitted to an external recording medium 140 through a media controller 125 and recorded in the medium. The image data recorded in the image file is reproduced on the image display section 130 through the image display control section 123. At this point, the AF/AE arithmetic section 126 performs an arithmetical operation for focus adjustment and exposure adjustment according to the RGB signals. For focus adjustment, the AF/AE arithmetic section 126 detects a contrast from the RGB signals for each object distance. The focus lens 114 focuses according to the result of the detection. The AF/AE arithmetic section 126 also extracts a luminance signal from the RGB signals and detects the luminance of the field. According to the result of this detection, the iris 113 adjusts the exposure so that object light is given to the solid imaging device at an appropriate intensity.

The digital camera 100 has the fundamental structure described above.

The digital camera 100 features the focus lens 114. The focus lens 114 will now be described in detail.

Figure 4:
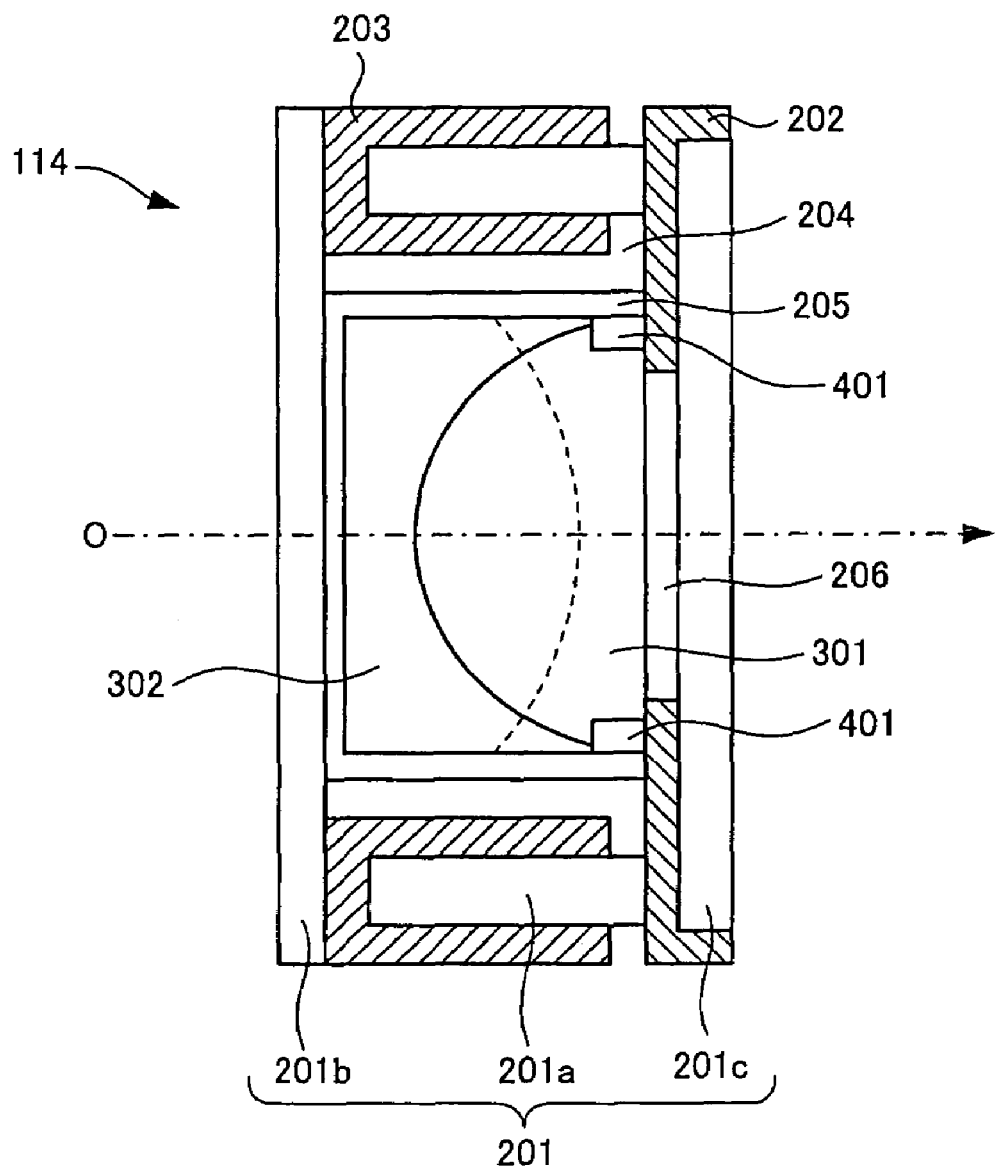
FIG. 4 is a schematic illustration of the structure of the focus lens shown in FIG. 3.

FIG. 4 is a schematic illustration of the focus lens shown in FIG. 3. In this figure, light comes into the lens in the direction indicated by arrow O from the left. The side (left) into which light comes is the front and the side (right) from which the light goes out is the back.

The focus lens 114 includes a liquid container 201 containing an electroconductive liquid 301 and an insulating liquid 302 immiscible with the electroconductive liquid 301. The liquid container 201 includes a tube 201a whose ends are closed with caps 201b and 201c. This liquid container 201 is made of transparent glass, and it is one type of the liquid container used in the present invention.

The inner surface (in contact with the liquid) of the cap 201c closing the back end of the tube 201a is coated with a hydrophilic film 206 having a high wettability to the electroconductive liquid 301. The inner surfaces not coated with the hydrophilic film 206 are coated with a water-repellent film 205 having a lower wettability to the electroconductive liquid 301 than to the insulating liquid 302. For example, Cytop (manufactured by Asahi Glass Co., Ltd.) is used as the water-repellent film 205.

The liquid container 201 also has an insulating film 204 disposed between the tube 201a and the water-repellent film 205, and a first electrode 202 and a second electrode 203. The first electrode 202 is disposed in contact with the liquid, surrounding the hydrophilic film 206. The second electrode 203 is isolated from the liquid by the insulating film 204. The insulating film 204 may be formed of a polyimide film (for example, produced by Nissan Chemical Industries, Ltd.) by applying a solution of a polyamic acid in alcohol onto the second electrode 203 and annealing it at 200° C. The first electrode 202 and the second electrode 203 are connected to the focus controller 114a shown in FIG. 3, and the focus controller 114a applies a voltage between these electrodes. The first electrode 202 is one type of the first electrode used in the present invention; the second electrode 203 is one type of the second electrode used in the present invention. The focus controller 114a corresponds to the controlling section being an element of the present invention.

The liquid container 201 also has a gas-absorbing member 401 in contact with both the liquid and the first electrode 202. In the present embodiment, inexpensive activated carbon (for example, produced by Nippon Carbon Co., Ltd.) is used as the gas-absorbing member 401, and it is fixed to the water-repellent film 205 and the first electrode 202 with, for example, an epoxy resin. The gas-absorbing member 401 is one type of the gas-absorbing material used in the present invention.

The liquid container 201 contains the electroconductive liquid 301 and the insulating liquid 302 which have different refractive indices. In the present embodiment, the electroconductive liquid 301 is water containing a supporting electrolyte (for example, 0.1 mol/L of tetrabutylammonium perchlorate) and the insulating liquid 302 is an organic solvent (for example, ISOPAR produced by Exxon Mobil Corporation). The electroconductive liquid 301 is one type of the electroconductive liquid used in the present invention and the insulating liquid 302 is one type of the insulating liquid used in the present invention.

When no voltage is applied between the first electrode 202 and the second electrode 203, the electroconductive liquid 301 is repelled from the water-repellent film 205 to form an interface having a shape as defined by the solid line between the electroconductive liquid 301 and the insulating liquid 302 shown in FIG. 4. In this case, the first electrode 202 comes in contact with the electroconductive liquid 301.

When the focus controller 114a applies a voltage between the first electrode 202 and the second electrode 203 according to a direction from the signal processor 120 shown in FIG. 3, charges are released from the first electrode 202 to the electroconductive liquid 301 and opposite-polarity charges are accumulated on the second electrode 203. The charges released to the electroconductive liquid 301 are attracted to the charges on the second electrode 203 by Coulomb force, so that charges in the electroconductive liquid 301 are drawn to the vicinity of the water-repellent film 205. Consequently, the interface between the electroconductive liquid 301 and the insulating liquid 302 forms a shape as defined by the dotted line shown in FIG. 4.

The focus lens 114 realizes TTLAF according to the following procedure.

First, while the focus controller 114*a* gradually varies the voltage applied to the first electrode 202 and the second electrode 203 to change the shape of the interface between the electroconductive liquid 301 and the insulating liquid 302, the solid imaging device 111 shown in FIG. 3 captures image signals. Then, the contrast of imaging signals is detected in the AF/AE arithmetic section 126, and a voltage exhibiting a peak contrast is applied to the first electrode 202 and the second electrode 203. The lens shape is thus fixed to bring the closest object into focus and a picture is taken in this state.

It is considered that if voltage is repeatedly applied between the first electrode 202 and the second electrode 203 to release charges into the electroconductive liquid 301, the electroconductive liquid 301 may be electrolyzed to generate hydrogen and oxygen, and consequently bubbles may be trapped in the liquid container 201. In the present embodiment, however, the gas-absorbing member 401 in contact with both the liquid and the first electrode 202, provided in the liquid container 201 efficiently absorbs gas newly generated at the first electrode 202 and the gas which has been present in the liquid container 201, before the gas turns into bubbles. The trapping of bubbles in the liquid container 201 is thus prevented. Consequently, the optical characteristics of the lens can be maintained over a long time, even if voltage is repeatedly applied between the first electrode 202 and the second electrode 203.

Up to this point the first embodiment of the present invention has been described.

Other forms of the gas-absorbing material, different from the first embodiment will now be described using second to seventh embodiments.

The imaging apparatuses of the following second to seventh embodiments have substantially the same structure as the apparatus of the first embodiment. The descriptions of the same parts designated by the same reference numerals as in the first embodiment are not repeated, and only different points will be described below. In the focus lens of the second to seventh embodiments, object light comes in the direction indicated by arrow O from the left of the figures, and the side (left) into which light comes is the front and the side (right) from which the light goes out is the back, as in the first embodiment.

Figure 5:
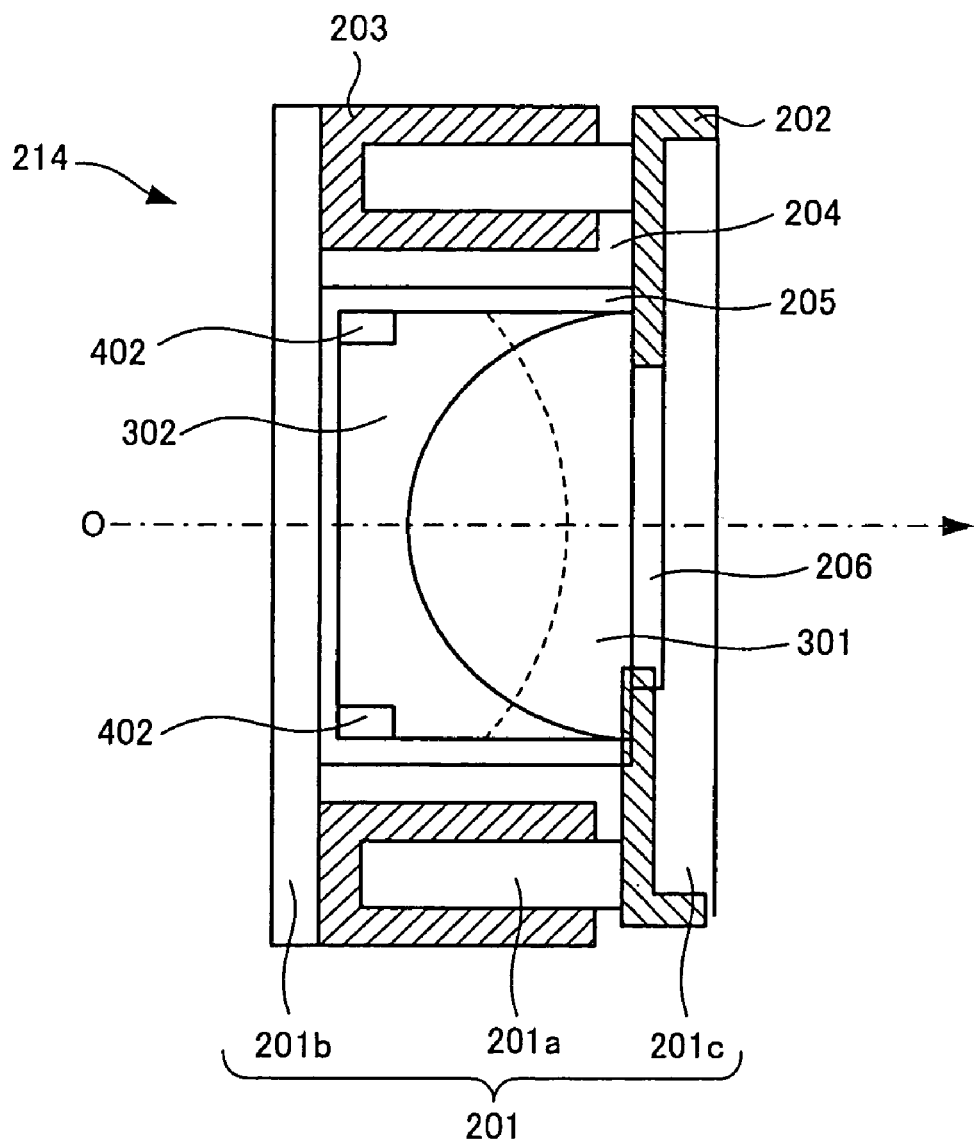
FIG. 5 is a schematic illustration of the structure of a focus lens according to a second embodiment.

FIG. 5 is a schematic illustration of the structure of a focus lens according to the second embodiment.

The focus lens 214 shown in FIG. 5 is incorporated in the optical shooting system 110 of the digital camera 100 shown in FIG. 3, as an alternative to the focus lens 114.

In this focus lens 214, a gas-absorbing member 402 in contact with the liquid is provided at the front side in the liquid container 201. The gas-absorbing member 402 of the second embodiment is made of carbon nanotubes (for example, produced by Aldrich) having a high hydrogen absorption capacity and is fixed to the water-repellent film 205 with, for example, an epoxy resin. This gas-absorbing member 402 is one type of the gas-absorbing material used in the present invention.

Since the gas-absorbing member 402 in contact with the liquid is provided in the liquid container 201, gas in the liquid container 201 is efficiently absorbed by the gas-absorbing member 402 before the gas turns into bubbles. The trapping of bubbles in the liquid container 201 is thus prevented. Consequently, the optical characteristics of the lens can be maintained over a long time, even if voltage is repeatedly applied between the first electrode 202 and the second electrode 203.

Figure 6:
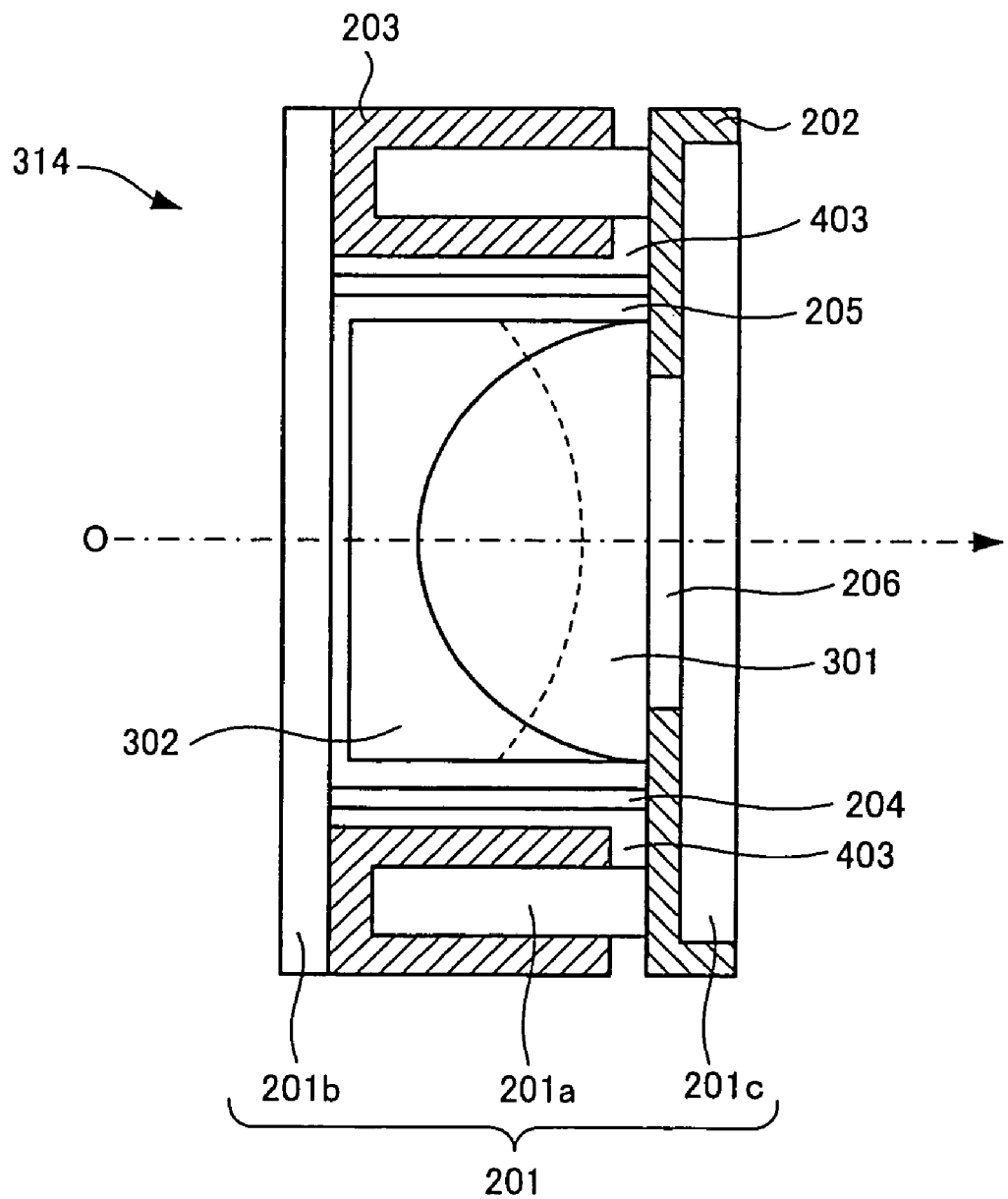
FIG. 6 is a schematic illustration of the structure of a focus lens according to a third embodiment.

FIG. 6 is a schematic illustration of the structure of a focus lens according to the third embodiment.

The focus lens 314 shown in FIG. 6 is also incorporated in the optical shooting system 110 of the digital camera 100 shown in FIG. 3, as an alternative to the focus lens 114.

In this focus lens 314, the liquid container 201 has an insulating film 204 disposed between the tube 201*a* and the water-repellent film 205, and a first electrode 202 and a second electrode 203, as in the focus lens 114 according the first embodiment shown in FIG. 4. The first electrode 202 is disposed in contact with the liquid, surrounding the hydrophilic film 206. The second electrode 203 is isolated from the liquid by the insulating film 204. In the focus lens 314 of the third embodiment, a gas-absorbing film 403 is further provided between the tube 201*a* and the insulating film 204 in the liquid container 201. The gas-absorbing film 403 of the third embodiment can be formed by applying inexpensive activated carbon powder dispersed in an aqueous solution of polyvinyl alcohol onto the second electrode 203 and drying it. The dispersoid in the polyvinyl alcohol aqueous solution may be powder of carbon nanotubes (for example, produced by Aldrich), which have a high hydrogen absorbing capacity. The gas-absorbing film 403 is one type of the gas-absorbing material used in the present invention. The insulating film 204 may be formed of a polyimide film (for example, produced by Nissan Chemical Industries, Ltd.) by applying a solution of a polyamic acid in alcohol onto the gas-absorbing film 403 and annealing it at 200° C.

Since the gas-absorbing film 403 is provided in contact with the second electrode 203, gas generated at the second electrode 203 is efficiently absorbed by the gas-absorbing film 403 before the gas turns into bubbles. The liquid container 201 is thus prevented from being broken. In addition, since the gas generated in the liquid container 201 passes through the water-repellent film 205 and the insulating film 204 and is absorbed by the gas-absorbing film 403, the trapping of bubbles in the liquid container 201 is also prevented. Consequently, the optical characteristics of the lens can be maintained over a long time, even if voltage is repeatedly applied between the first electrode 202 and the second electrode 203.

Figure 7:
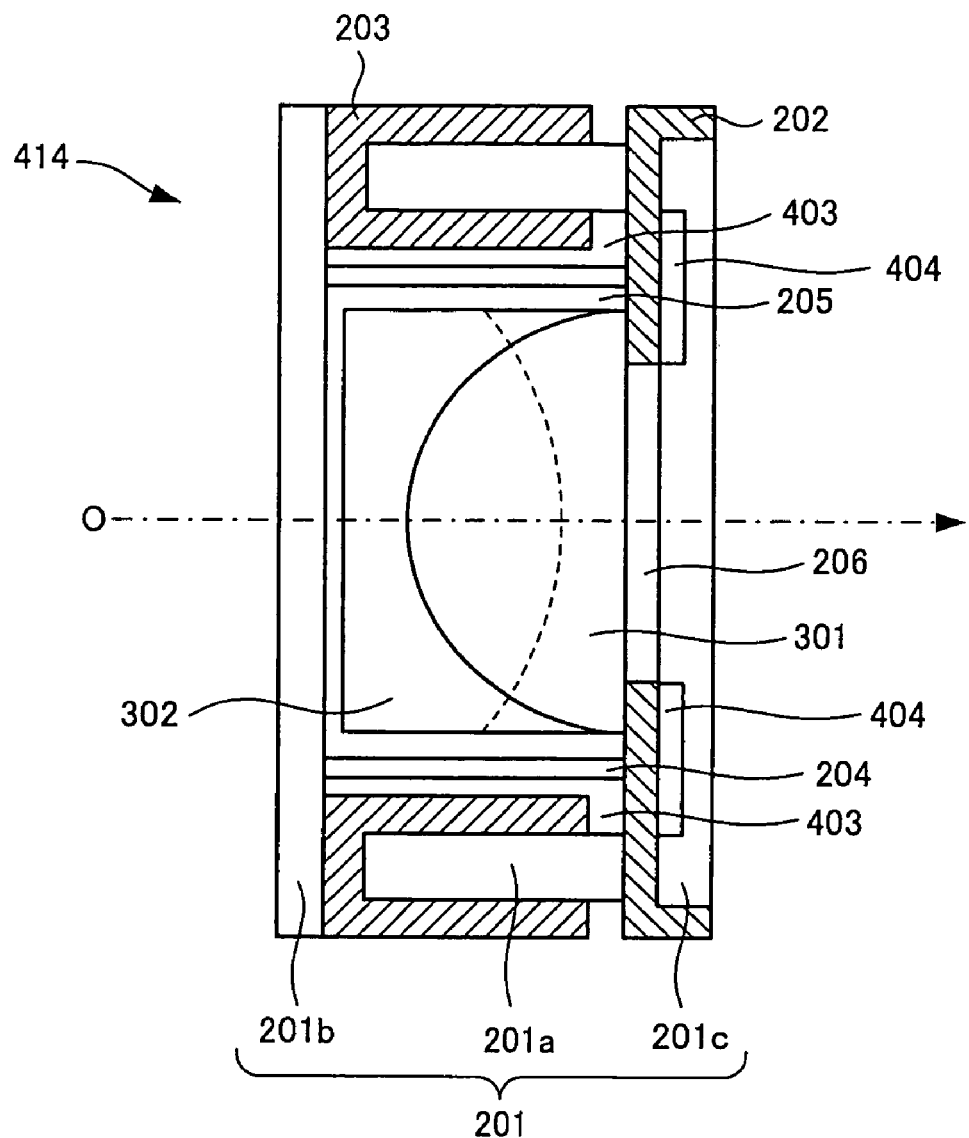
FIG. 7 is a schematic illustration of the structure of a focus lens according to a fourth embodiment.

FIG. 7 is a schematic illustration of the structure of a focus lens according to the fourth embodiment.

The focus lens 414 shown in FIG. 7 is also incorporated in the optical shooting system 110 of the digital camera 100 shown in FIG. 3, as an alternative to the focus lens 114.

In this focus lens 414, the liquid container 201 has an insulating film 204 and a gas-absorbing film 403 which are disposed between the tube 201*a* and the water-repellent film 205, and a first electrode 202 and a second electrode 203, as in the focus lens 314 according to the third embodiment. The first electrode 202 is disposed in contact with the liquid, surrounding the hydrophilic film 206. The second electrode 203 is isolated from the liquid by the insulating film 204. In the focus lens 414 of the fourth embodiment, a gas-absorbing member 404 is further provided in contact with the first electrode 202 in the liquid container 201. In the fourth embodiment, inexpensive activated carbon (for example, produced by Nippon Carbon Co., Ltd.) can be used as the gas-absorbing member 404, and it is fixed to the first electrode 202 with, for example, an epoxy resin. The gas-absorbing member 404 is also one type of the gas-absorbing material used in the present invention.

Since the gas-absorbing film 403 is provided in contact with the second electrode 203 and the gas-absorbing member 404 is provided in contact with the first electrode 202, the gases newly generated at the first electrode 202 and the second electrode 203 and the gases which have been present in the liquid container 201 are efficiently absorbed by the gas-absorbing film 403 and the gas-absorbing member 404, before the gases turn into bubbles. The liquid container 201 is prevented from being broken and bubbles are also prevented from being trapped in the liquid container 201. Consequently, the optical characteristics of the lens can be maintained over a long time, even if voltage is repeatedly applied between the first electrode 202 and the second electrode 203.

Figure 8:
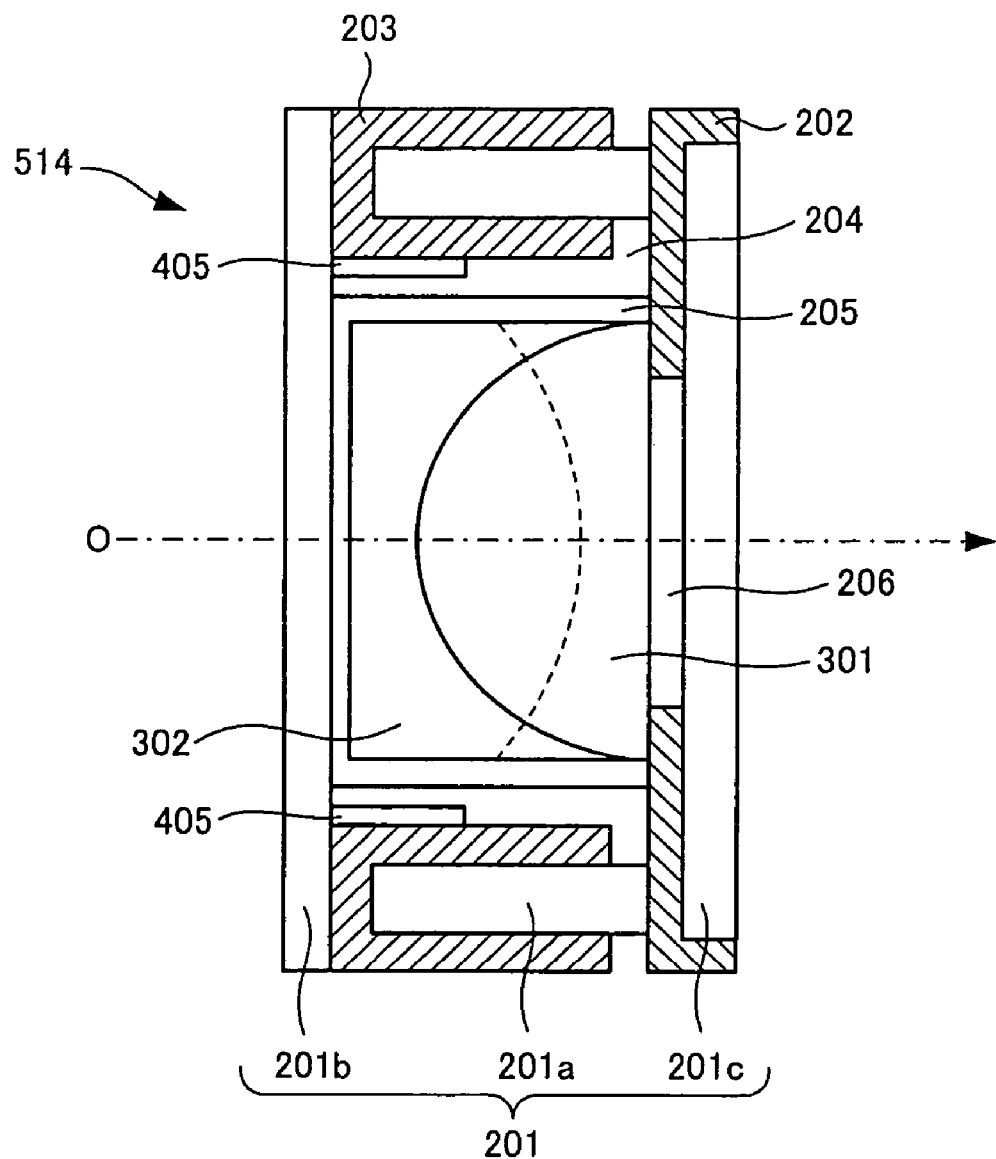
FIG. 8 is a schematic illustration of the structure of a focus lens according to a fifth embodiment.

FIG. 8 is a schematic illustration of the structure of a focus lens according to the fifth embodiment.

The focus lens 514 shown in FIG. 8 is also incorporated in the optical shooting system 110 of the digital camera 100 shown in FIG. 3, as an alternative to the focus lens 114.

In this focus lens 514, the liquid container 201 has an insulating film 204 disposed between the tube 201a and the water-repellent film 205, and a first electrode 202 and a second electrode 203, as in the focus lens 114 according to the first embodiment shown in FIG. 4. The first electrode 202 is disposed in contact with the liquid, surrounding the hydrophilic film 206. The second electrode 203 is isolated from the liquid by the insulating film 204. The focus lens 514 of the fifth embodiment also has a gas-absorbing film 405 between the tube 201a and the insulating film 204 in the liquid container 201. The gas-absorbing film 405 of the fifth embodiment can be formed by applying inexpensive activated carbon dispersed in an aqueous solution of polyvinyl alcohol onto the front side of the second electrode 203 and drying it. The dispersoid in the polyvinyl alcohol aqueous solution may be powder of carbon nanotubes (for example, produced by Aldrich), which have a high hydrogen absorbing capacity. The gas-absorbing film 405 is one type of the gas-absorbing material used in the present invention.

Since the gas-absorbing film 405 is provided in contact with the second electrode 203, both gas newly generated at the second electrode 203 and the gas which has been present in the liquid container 201 are efficiently absorbed by the gas-absorbing film 405 before the gas turns into bubbles. The liquid container 201 is thus prevented from being broken and the trapping of bubbles in the liquid container 201 is thus prevented. In addition, since the gas-absorbing film 405 is provided only on the front side of the second electrode 203, the effective voltage at the back side of the second electrode 203 can be increased. Consequently, the optical characteristics of the lens can be maintained over a long time, even if voltage is repeatedly applied between the first electrode 202 and the second electrode 203.

Figure 9:
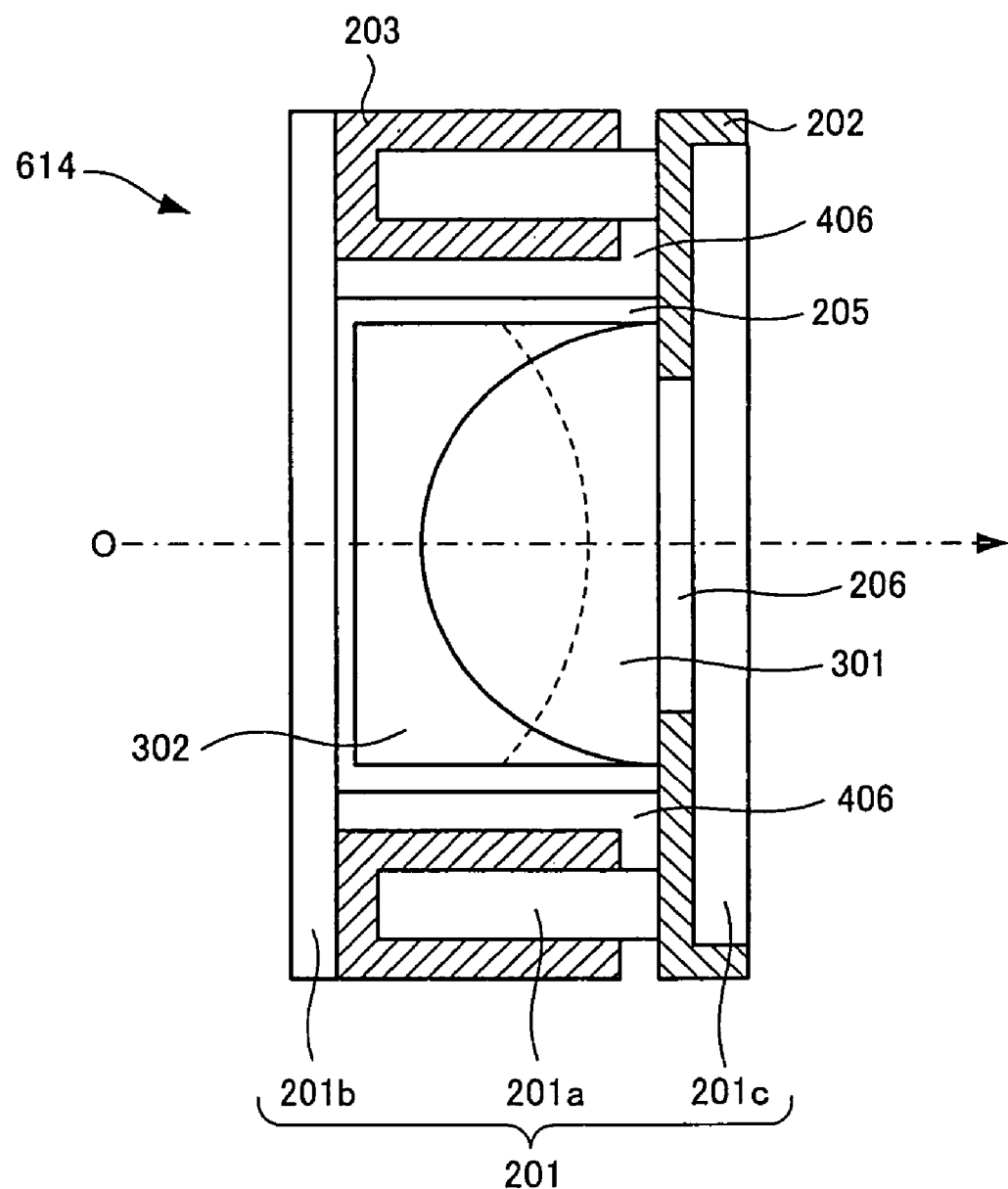
FIG. 9 is a schematic illustration of the structure of a focus lens according to a sixth embodiment.

FIG. 9 is a schematic illustration of the structure of a focus lens according to the sixth embodiment.

The focus lens 614 shown in FIG. 9 is also incorporated in the optical shooting system 110 of the digital camera 100 shown in FIG. 3, as an alternative to the focus lens 114.

In this focus lens 614, the liquid container 201 has an insulating film 406 containing a gas-absorbing material, instead of the insulating film 204 of the focus lens 114 according to the first embodiment shown in FIG. 4. The insulating film 406 may be formed of a polyimide film (for example, produced by Nissan Chemical Industries, Ltd.) by applying an alcohol solution of a polyamic acid containing 10 mass % of carbon nanotubes (for example, produced by Aldrich) having a high hydrogen absorption capacity onto the second electrode 203 and annealing it at 200° C. Alternatively, the insulating film 406 may contain 10 mass % each of iron powder (for example, produced by Mitsubishi Chemical Corporation) absorbing oxygen and the carbon nanofibers (for example, produced by Aldrich) having a high hydrogen absorption capacity. The insulating film 406 containing such a gas-absorbing material corresponds to the gas-absorbing material being an element of the present invention.

Since the insulating film 406 containing the gas-absorbing material is provided in contact with the second electrode 203, the gas generated at the second electrode 203 is effectively absorbed by the insulating film 406 before the gas turns into bubbles. The liquid container 201 is thus prevented from being broken. Also, the gases generated in the liquid container 201 and passing through the water-repellent film 205 are absorbed by the insulating film 406, and the gases are thus prevented from being trapped in the liquid container 201. Consequently, the optical characteristics of the lens can be maintained over a long time, even if voltage is repeatedly applied between the first electrode 202 and the second electrode 203.

Figure 10:
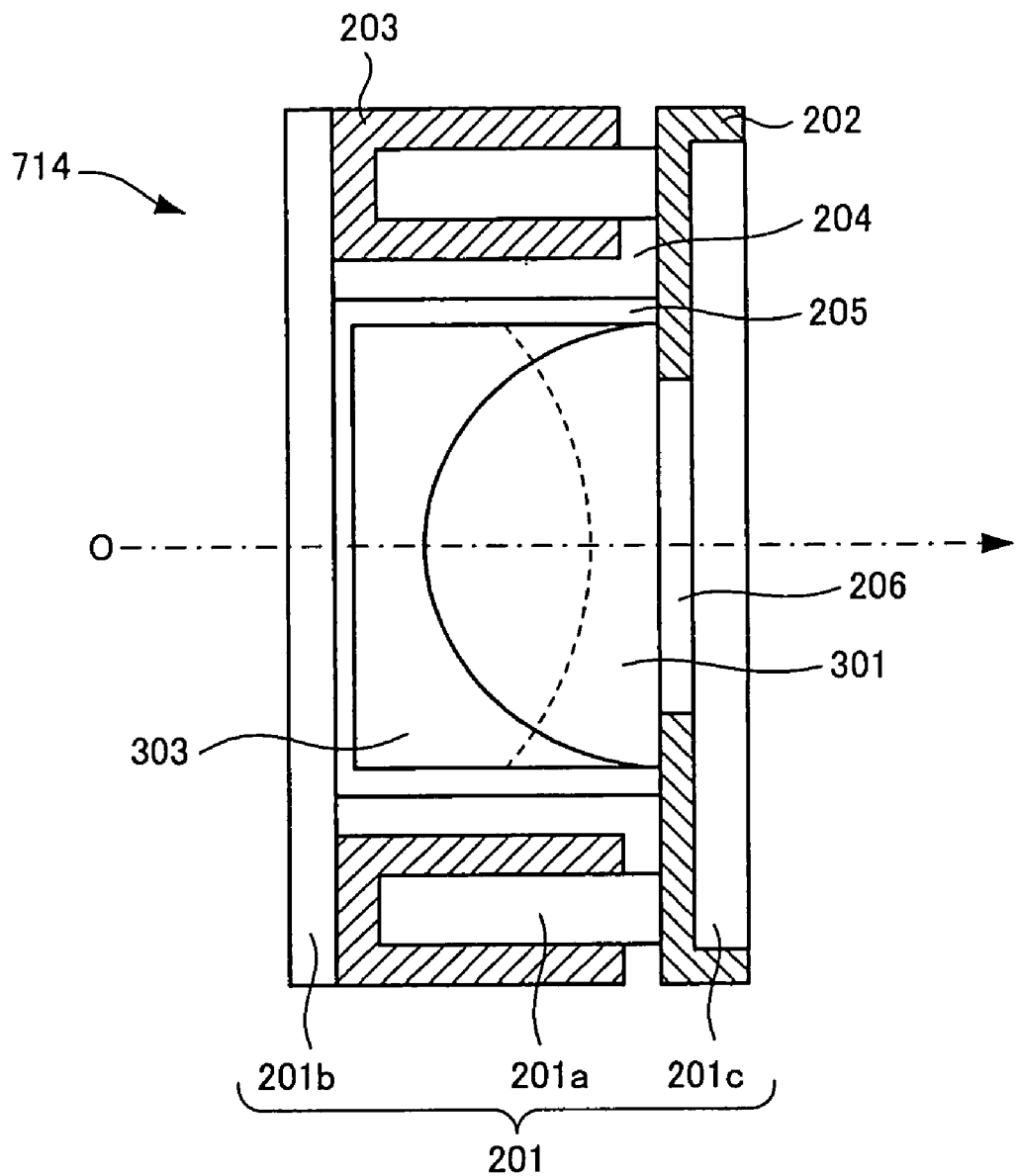
FIG. 10 is a schematic illustration of the structure of a focus lens according to a seventh embodiment.

FIG. 10 is a schematic illustration of the structure of a focus lens according to the seventh embodiment.

The focus lens 714 shown in FIG. 10 is also incorporated in the optical shooting system 110 of the digital camera 100 shown in FIG. 3, as an alternative to the focus lens 114.

In this focus lens 714, the liquid container 201 contains the electroconductive liquid 301 and an insulating liquid 303 containing a gas-absorbing material. These liquids have different refractive indices. In the seventh embodiment, the electroconductive liquid 301 may be water containing a supporting electrolyte (for example, 0.1 mol/L of tetrabutylammonium perchlorate), and the insulating liquid 303 may be an organic solvent (for example, ISOPAR produced by Exxon Mobil Corporation) containing a hydrogen absorber (for example, 5% of Ugilec C101 produced by Prodelec). The insulating liquid 303 is one type of the insulating liquid used in the present invention, and the hydrogen absorber is one type of the gas-absorbing material used in the present invention. While the present embodiment uses the insulating liquid containing a gas-absorbing material, the electroconductive liquid may contain the gas-absorbing material.

The use of a liquid containing a gas-absorbing material allows the gas-absorbing material to efficiently absorb gas dissolved in the liquid before the gas turns into bubbles. The trapping of bubbles in the liquid container 201 is thus prevented. Consequently, the optical characteristics of the lens can be maintained over a long time, even if voltage is repeatedly applied between the first electrode 202 and the second electrode 203.

Although the present invention has been described using the embodiments which are applied to a digital camera forming object images on a CCD solid imaging device and capturing the signals of object image data, the application of the present invention is not limited to such a digital camera. For example, the present invention may be applied to film cameras which form images on a photographic film, instant cameras which develop the film simultaneously with discharging the film, and video cameras which take moving pictures.

Although the embodiments have been described using a liquid container containing two types of liquid, an electroconductive liquid and an insulating liquid, the liquid container may contain three or more types of liquid.

Although the embodiments have been described using a focus lens as the optical device of the present invention, the optical device may be applied to zoom lenses or the like.

Some elements of the optical device according to the present invention will be described, in addition.

Gas-Absorbing Material

Any gas-absorbing material may be used. For example, the gas-absorbing material may absorb hydrogen or oxygen, and may preferably absorb hydrogen and oxygen.

Hydrogen absorbing materials may adsorb hydrogen or react with hydrogen. Preferably, the hydrogen absorbing material produces little water, but substantially no water, after absorbing hydrogen. Exemplary hydrogen absorbing materials include nickel-lanthanum alloys, titanium-iron alloys, titanium-manganese alloys, magnesium-nickel alloys, activated carbon, carbon nanotubes, and carbon nanofibers. By providing such a hydrogen absorbing material, hydrogen generated by electrolysis of water can be efficiently absorbed to prevent the liquid container from being expanded, and consequently the performances of the lens can be maintained.

The gas-absorbing material used in the present invention may be added in the liquid. In this instance, a hydrogen absorbing material is preferably added to the liquid. In particular, the hydrogen absorbing material preferably has an unsaturated bond capable of reacting with hydrogen. Examples of such hydrogen absorbing material include monobenzyl, dibenzyltoluene, phenylxylylethane, ditolyl ether, and diisononyl phthalate.

Exemplary oxygen absorbing materials include iron powder.

Liquid

The liquid used in the present invention is constituted of at least two types of liquid, including mutually immiscible electroconductive liquid and insulating liquid having different refractive indices.

Any combination of liquids may be applied. Preferably, water and an organic solvent are used. Preferred organic solvents include hydrocarbons, such as hexane, heptane, pentane, octane, and ISOPAR produced by Exxon Mobil Corporation; aromatic hydrocarbons, such as benzene, toluene, xylene, and mesitylene; halogenated hydrocarbons, such as difluoropropane, dichloroethane, chloroethane, and bromoethane; halogenated aromatic hydrocarbons, such as chlorobenzene; and ethers, such as dibutyl ether, anisole, and diphenyl ether.

Preferably, a supporting electrolyte is added to the water to increase the electric conductivity. Examples of the supporting electrolyte include TMAP (tetramethylammonium perchlorate) and TBAF (tetrabutylammonium hexafluorophosphate).

The above embodiments have described on the basis of the concept of the present invention. In addition, in order to put the present invention into practical use, it is preferable that a measure be taken to prevent the degradation of the lens performance due to foreign matter or water on the optical path.

For example, a water-repellent film is preferably provided on the external surface intersecting the optical path (hereinafter referred to as the light-transmitting surface) of the liquid container. By giving a water-repellency to the light-transmitting surface, foreign matter and water are prevented from being trapped so that high optical transparency of the optical device can be maintained. The water-repellent film is preferably made of silicone resin, organopolysiloxane block copolymer, fluorocarbon polymer, or polytetrafluoroethane.

Alternatively, a hydrophilic film may be provided on the light-transmitting surface of the container of the optical device. By giving a hydrophilicity or oil-repellency to the light-transmitting surface, foreign matter can be prevented from being trapped. The hydrophilic film is preferably made of acrylate polymer or a coating of a surfactant, such as a nonionic organosilicone surfactant. The hydrophilic film may be formed by silane monomer plasma polymerization or ion beam treatment.

The light-transmitting surface of the container of the optical device may be provided with a photocatalyst, such as titanium oxide. The photocatalyst reacted with light can decompose contaminants to keep the light-transmitting surface clean.

The light-transmitting surface of the container of the optical device may be provided with an antistatic film. If electricity from the electrodes or static electricity is built up at the light-transmitting surface, the light-transmitting surface becomes liable to trap foreign matter or dust. By providing the antistatic film on the light-transmitting surface, such unnecessary matter can be prevented from being trapped to maintain the optical transparency of the optical device. The antistatic film is preferably made of a polymer alloy. A particularly preferred polymer alloy may be prepared from polyether or polyether ester amide, or it may have a cationic group. For example, LEOLEX (product name, produced by Dai-Ichi Kogyo Seiyaku Co., Ltd.) is preferably used. Preferably, the antistatic film is formed by a mist method.

The container of the optical device may be made of a material containing a contamination-resistant material. Preferred contamination-resistant materials include fluorocarbons resins, such as alkylalkoxysilane containing fluorine and polymers or oligomers containing a fluoroalkyl group. Preferably, such a resin has a functional group crosslinkable with a curable resin. The contamination-resistant material is preferably added in a minimum amount capable of providing a contamination resistance.

What is claimed is:

1. An optical device comprising:
    a liquid container transmitting light at least in the optical axis direction, the liquid container containing an insulating liquid and an electroconductive liquid which generates gas by energization, the insulating liquid and the electroconductive liquid being mutually immiscible and optically transparent, and having different refractive indices;
    a first electrode in contact with the electroconductive liquid;
    a second electrode isolated from the electroconductive liquid; and
    a gas-absorbing material disposed in or around the liquid container, the gas-absorbing material absorbing the gas.

2. The optical device according to claim 1, wherein the gas-absorbing material is in contact with or close to at least one of the first electrode and the second electrode.

3. The optical device according to claim 1, wherein at least one of the insulating liquid and the electroconductive liquid contains the gas-absorbing material.

4. The optical device according to claim 1, wherein the gas-absorbing material forms a gas-absorbing member disposed in the liquid container.

5. The optical device according to claim 1, wherein the gas-absorbing material forms part of the walls of the liquid container.

6. The optical device according to claim 1, wherein the electroconductive liquid is an aqueous solution, and the gas-absorbing material absorbs hydrogen.

7. The optical device according to claim 1, wherein the electroconductive liquid is an aqueous solution, and the gas-absorbing material absorbs oxygen.

8. A lens unit comprising:
    a liquid container transmitting light at least in the optical axis direction, the liquid container containing an insulating liquid and an electroconductive liquid which generates gas by energization, the insulating liquid and the electroconductive liquid being mutually immiscible and optically transparent and have different refractive indices;

a first electrode in contact with the electroconductive liquid;

a second electrode isolated from the electroconductive liquid; and a gas-absorbing material disposed in or around the liquid container, the gas-absorbing material absorbing the gas, wherein the shape of the interface between the insulating liquid and the electroconductive liquid is varied according to voltage applied between the first electrode and the second electrode.

9. An imaging apparatus which takes pictures by capturing object light coming through an optical shooting system incorporated therein, the imaging apparatus comprising:

a liquid container transmitting light at least in the optical axis direction, the liquid container containing an insulating liquid and an electroconductive liquid which generates gas by energization, the insulating liquid and the electroconductive liquid being mutually immiscible and optically transparent and having different refractive indices;

a first electrode in contact with the electroconductive liquid;

a second electrode isolated from the electroconductive liquid;

a gas-absorbing material disposed in or around the liquid container, the gas-absorbing material absorbing the gas; and a controlling section which varies the shape of the interface between the insulating liquid and the electroconductive liquid according to voltage applied between the first electrode and the second electrode.

10. The imaging apparatus according to claim 9, further comprising a solid imaging device on which the object light forms an object image and which outputs signals representing the object image.

* * * * *